United States Patent
Marszalek

(10) Patent No.: US 10,970,979 B2
(45) Date of Patent: Apr. 6, 2021

(54) PRODUCT DISPLAY AND INVENTORY MONITORING

(71) Applicant: Sennco Solutions, Inc., Plainfield, IL (US)

(72) Inventor: Christopher Marszalek, Plainfield, IL (US)

(73) Assignee: SENNCO SOLUTIONS, INC., Plainfield, IL (US)

( * ) Notice: Subject to any disclaimer, the term of this patent is extended or adjusted under 35 U.S.C. 154(b) by 197 days.

(21) Appl. No.: 16/205,657

(22) Filed: Nov. 30, 2018

(65) Prior Publication Data

US 2019/0180581 A1 Jun. 13, 2019

Related U.S. Application Data

(60) Provisional application No. 62/593,726, filed on Dec. 1, 2017.

(51) Int. Cl.
| | | |
|---|---|---|
| *G08B 13/14* | (2006.01) | |
| *A47F 3/00* | (2006.01) | |
| *A47F 7/024* | (2006.01) | |
| *A47F 5/08* | (2006.01) | |
| *E05B 73/00* | (2006.01) | |
| *G06Q 10/08* | (2012.01) | |
| *G08B 13/24* | (2006.01) | |

(52) U.S. Cl.
CPC ......... *G08B 13/1463* (2013.01); *A47F 3/002* (2013.01); *A47F 5/0861* (2013.01); *A47F 7/024* (2013.01); *E05B 73/0005* (2013.01); *G06Q 10/087* (2013.01); *G08B 13/149* (2013.01); *G08B 13/1436* (2013.01); *G08B 13/2434* (2013.01); *G08B 13/2462* (2013.01)

(58) Field of Classification Search
CPC ............. G08B 13/149; G08B 13/1436; G08B 13/1463; G08B 13/2434; G08B 13/2462; A47F 3/002; A47F 7/024; A47F 5/0861; E05B 73/0005; G06Q 10/087
USPC ....................................... 340/568.8
See application file for complete search history.

(56) References Cited

U.S. PATENT DOCUMENTS 8,321,304 B2  11/2012  Khan et al.
9,125,501 B2   9/2015  Reynolds et al.
(Continued)

FOREIGN PATENT DOCUMENTS

WO    2010112666 A1    10/2010
WO    2016191404 A1    12/2016

OTHER PUBLICATIONS

ESR 042619, European Search Report cited in corresponding European application No. 18209765.9; dated Apr. 26, 2019; 10 pp.
(Continued)

*Primary Examiner* — Joseph H Feild
*Assistant Examiner* — Sharmin Akhter
(74) *Attorney, Agent, or Firm* — Lempia Summerfield Katz LLC

(57) ABSTRACT

A system for monitoring a product on display includes a display pedestal configured to secure the product to a fixture to which the display pedestal is mounted. The display pedestal includes a tether to allow movement of the product relative to the fixture. The system includes a sensor system including a capacitive sensor pad. The capacitive sensor pad is supported by the fixture and configured to detect the movement of the product via the tether.

9 Claims, 5 Drawing Sheets

(56) References Cited

U.S. PATENT DOCUMENTS

| | | |
|---|---|---|
| 2004/0155777 A1 | 8/2004 | Mitchell |
| 2006/0071774 A1 | 4/2006 | Brown |
| 2006/0139170 A1 | 6/2006 | Ott |
| 2013/0268316 A1* | 10/2013 | Moock .............. H04M 1/72569 |
| | | 705/7.29 |
| 2016/0283898 A1 | 9/2016 | Reuther |
| 2016/0283899 A1* | 9/2016 | Ryan, III ............. G06Q 10/087 |

OTHER PUBLICATIONS

Office Action cited in corresponding European app No. 18209765.9-1011; dated May 6, 2020; 5 pp.

* cited by examiner

PRODUCT DISPLAY AND INVENTORY MONITORING

CROSS-REFERENCE TO RELATED APPLICATION

This application claims the benefit of U.S. provisional application entitled "Product Display and Inventory Monitoring," filed Dec. 1, 2017, and assigned Ser. No. 62/593,726, the entire disclosure of which is hereby expressly incorporated by reference.

BACKGROUND OF THE DISCLOSURE

Field of the Disclosure

The disclosure relates generally to monitoring product display and inventory involving shelves and other fixtures.

Brief Description of Related Technology

Inventory monitoring, control, and loss prevention are useful in retail, manufacturing, shipping, and various other settings. The operation of businesses in these fields often entails the evaluation, placement, and removal of items on shelves and other fixtures. In the retail sphere, the stock of merchandise items (i.e., products) is replenished as soon as possible after removal from a storage, display, or other location.

Electronic article surveillance (EAS) and other product inventory systems attempt to monitor, detect, and track the movement of products. These and other systems often also attempt to provide alerts regarding the loss, destruction or theft of products. Inventory systems may utilize barcode scanners, radio frequency identification (RFID) tags, shelf weight scales, cables, tethering devices, wireless sensors, and closed-circuit television networks. Unfortunately, movement, theft, or loss of product is often not detected in a timely fashion in connection with such inventory systems.

Capacitive sensor pad systems have been developed to monitor the stock or supply of products disposed on a shelf. The sensor pads in such systems detect changes in capacitance as the products are added or removed from the shelf. The detected capacitance change thus allows the product inventory to be tracked electronically. An operator may then receive a notification from the sensor pad system regarding the change in product inventory.

SUMMARY OF THE DISCLOSURE

In accordance with one aspect of the disclosure, a system for monitoring a product on display includes a display pedestal configured to secure the product to a fixture to which the display pedestal is mounted, the display pedestal including a tether to allow movement of the product relative to the fixture, and a sensor system including a capacitive sensor pad, the capacitive sensor pad being supported by the fixture and configured to detect the movement of the product via the tether.

In accordance with another aspect of the disclosure, a system for monitoring a product on display includes a shelf, a barrier configured to define a restricted access zone for storage of inventory of the product on the shelf and to define an open access zone for instances of the product on the shelf, and a sensor system including a capacitive sensor pad, the capacitive sensor pad being supported by the shelf, extending across the restricted access zone and the open access zone, and configured to detect movement of the product relative to the restricted access zone or the open access zone. The sensor system includes a processor configured to determine whether the detected movement is indicative of a removal of the product from the restricted access zone or the open access zone.

In accordance with yet another aspect of the disclosure, a method of monitoring a product on display includes detecting interaction with the product via a sensor system, the sensor system including a capacitive sensor pad supported by a fixture, the capacitive sensor pad being configured to detect movement of the product relative to the fixture, the capacitive sensor pad being disposed between the fixture and a display pedestal that secures the product to the fixture, and generating, based on the detected interaction, interaction data indicative of customer interactions with the product.

In connection with any one of the aforementioned aspects, the systems and/or methods described herein may alternatively or additionally include any combination of one or more of the following aspects or features. The display pedestal is configured to support the product when the tether is disposed in a retracted position such that the product is disposed between the product and the capacitive sensor pad when the product is in a retracted position. The display pedestal includes a base configured to be anchored relative to the fixture, the base being disposed between the product and the capacitive sensor pad when the tether is disposed in the retracted position. The capacitive sensor pad is configured to detect a lift of the product from the base of the display pedestal. The base of the display pedestal contributes to a capacitive signature of the capacitive sensor pad for the product. The tether or a coil spring of the display pedestal contributes to a capacitive signature of the capacitive sensor pad for the product. The display pedestal includes a spool about which the tether is wound in a retracted position. The capacitive sensor pad is configured to detect a change in capacitance resulting from unwinding of the tether or spring from the spool. The capacitive sensor pad is configured to detect a change in capacitance resulting from a change in position of the product relative to the capacitive sensor pad despite disposition of the display pedestal in between the product and the capacitive sensor pad when the product is disposed in a retracted position. The capacitive sensor pad is configured to detect each instance of a lift of the product from the display pedestal. The processor is configured to generate, based on each detected instance, interaction data indicative of customer interactions with the product. The system further includes a shelf that supports the sensor system and the display pedestal. The shelf includes a barrier that defines a restricted access zone for storage of inventory of the product on the shelf. The capacitive sensor pad extends across the restricted access zone such that the sensor system is configured to track movement of instances of the product in the inventory. The shelf extends beyond the barrier to provide demonstration zone for the display pedestal and an open storage zone around the demonstration zone for storage of further inventory of the product on the shelf. The barrier and the capacitive sensor pad are configured such that the capacitive sensor pad detects movement of the barrier. The capacitive sensor pad extends across the open storage zone such that the sensor system is configured to track movement of further instances of the product in the further inventory. The processor is further configured to generate a low inventory notification based on the removal of the product results in a low inventory condition in the restricted access zone or the open access zone. The system further includes a display pedestal configured to secure a demonstration instance of the product to the shelf, the display pedestal including a tether to allow movement of the product relative to the fixture, wherein the capacitive sensor pad is configured to detect a lift of the demonstration instance of the product from the display pedestal. Detecting the interaction includes detecting a lift of the product from the display pedestal. The method further includes comparing the interaction data with sales data for the product. The method further includes determining whether the interaction data is indicative of a theft attempt. The fixture includes a shelf that the supports the capacitive sensor pad and the display pedestal. The shelf includes a barrier that defines a restricted access zone for storage of inventory of the product on the shelf. Generating the interaction data includes tracking movement of instances of the product relative to the restricted access zone. The method further includes determining whether a low inventory condition is present based on the tracked movement of the instances of the product. The method further includes detecting, via the sensor system, movement of the barrier.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
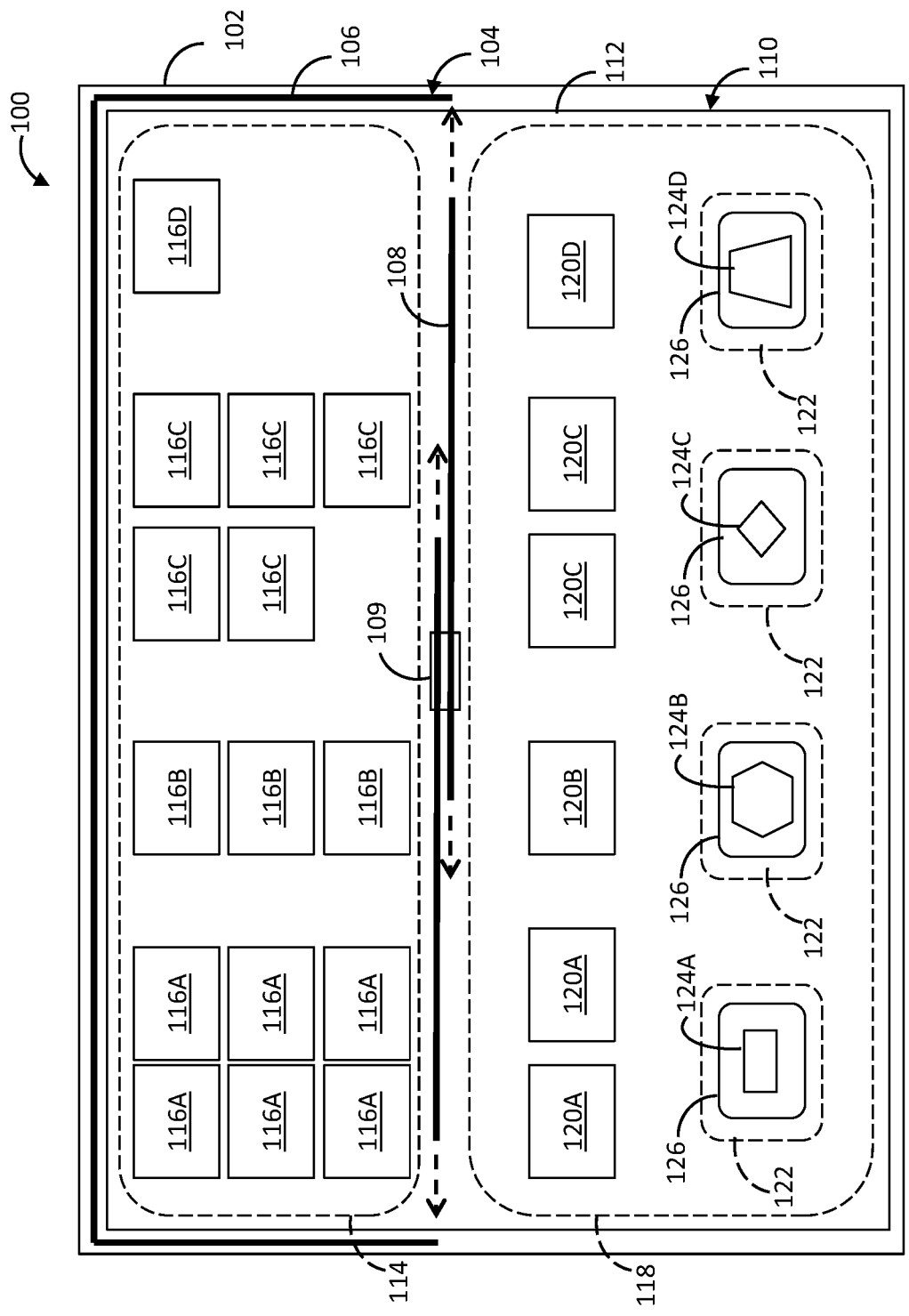
FIG. 1 is a schematic diagram of a product monitoring system for a product display and inventory in accordance with one example.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Product display monitoring systems and methods are described. The disclosed systems and methods automatically monitor and track the movement, location, presence, and/or absence of product items on an inventory or display fixture, such as a shelf. The monitoring and tracking may be implemented via a sensor system having a capacitive sensor pad. The capacitive sensor pad is supported by, and integrated to any desired extent with, the display fixture.

The disclosed systems and methods to provide the monitoring in connection with one or more other product display features. For instance, the monitoring may be provided in connection with the secure display of tester or demonstration product units. The tester or demonstration units may be securely displayed via, for example, a display pedestal supported by the fixture. The display pedestals may be configured to securely present the demonstration or tester instances of the product via a tether. The tethering and other aspects of the display pedestal do not interfere with the capacitive sensing. The display pedestals may, in fact, facilitate the capacitive sensing of interactions with the product secured via the display pedestals. For instance, the sensor system may be configured to detect a change in capacitance resulting from an unwinding of the tether or coil spring of (or inside) the display pedestal. In these and other ways, the monitoring may be indicative of product lifts or other interactions with the demonstration units. Pedestal positions may also be logically associated with sensor positions, thereby enabling the monitoring the activity of specific product brands, models, or product display layout (e.g., plan-o-gram) positions. The association may be implemented as a registration of products as described in U.S. patent application Ser. No. 15/692,372 ("Security Device Registration"), the entire disclosure of which is hereby incorporated by reference.

The disclosed systems may also provide the product monitoring relative to respective zones in which the product is organized, presented, or otherwise disposed via the fixture. Such product monitoring may distinguish between monitoring changes in open shelf inventory and limited access inventory. For instance, the shelf (or other fixture) may include a barrier that defines multiple zones for storage and/or presentation of instances of the product. One zone may be disposed behind the barrier as a restricted access zone for bulk or other storage of the product. Another zone may be in front of the barrier as an open access zone for unrestricted access to instances of the product. A limited amount of inventory of the product may be stored in the open access zone. A third zone may correspond with a tester or demonstration instance of the product. The disclosed systems and methods thus allow interactions with the products via testers, while also providing easy access to limited inventory and restricted access to bulk inventory. The capacitive sensor pad may extend across all of the zones so that movement of product relative to the defined zones may be tracked or otherwise monitored. Interaction data indicative of the movement may then be relayed in real time to provide product status and other information to an operator of the system.

The definition of multiple zones may be useful in limiting the amount of easily accessible open product, providing restricted access to bulk storage of additional product, and securely displaying live product that can be tested by consumers. Limiting the amount of open product on a shelf and monitoring product movement limits the potential for product theft. Providing restricted access to bulk product nearby allows for quick restocking of open product. Securely displaying live product allows consumers to interact with and test actual products. The systems and methods provide the product monitoring and tracking while being useful in these and other ways. For these and other reasons, the disclosed systems and methods are capable of enhancing consumer experience, decreasing theft, and improving inventory management of products.

The disclosed systems and methods may be useful in eliminating or decreasing manual inspections of display shelves, cases, and other product displays. The condition of securely displayed product units, such as fragrance testers, continues to demand manual inspections. For instance, inventory levels or placement of items in storage, sale, or display areas continue to be inspected and verified by employees. Avoiding manual inspections may prevent, minimize or decrease product and revenue loss due to pilferage, inadequate product stocking, and inadequate display arrangements. Although the disclosed systems and methods may be described and shown in connection with the display of fragrance product items, the disclosed systems and methods are useful in connection with a wide variety of products.

The disclosed systems and methods may also be useful in collecting data corresponding to a product in order to determine sales data. A consumer may, for example, lift and/or inspect a product on display to assess its function and/or aesthetics. For example, a consumer may conduct a tactile evaluation and assess the feel, weight, functionality and/or the like of a product. Generally, many consumers may perform such inspections of the same product. Some consumers may conduct a thorough evaluation of a product, whereas others may evaluate the product for a brief duration. Further, some products may be evaluated frequently, whereas other products have infrequent and/or short interactions with the consumer. Some consumers may ultimately purchase a product after conducting an evaluation. Retailers and/or manufacturers may desire analytic information pertaining to consumer interaction with a product as such information may further guide point-of-sale marketing. However, gauging consumer interest in a product may be expensive, time consuming, difficult to implement, and/or prone to error. Therefore, data pertaining to instances that a consumer evaluates a product is often unavailable. Retailers and/or manufacturers may have point-of-sale data. Such data, however, is generally limited to a purchase of a product. Moreover, retailers and/or manufacturers may desire more statistical data. For example, data including the quantity of times a certain product is evaluated, the frequency of evaluations, the respective times of day of each evaluation and/or the duration of each respective evaluation, may assist retailers and/or manufacturers in quantifying consumer interest in a certain product. Additionally, such data may focus sales efforts. Manufacturers and/or retailers may desire to obtain such data quickly and/or automatically. Still further, the ability to provide such data to a source remote from the display area may be desirable.

The disclosed systems and methods may also be useful in triggering the display of digital media or audio in a visual/audio device when an interaction of the customer with the product is determined. The digital media may contain information about the product being evaluated such as pricing, reviews, description, related articles, and the like.

Although described in connection with product display shelves, the disclosed systems and methods are not limited to any particular type of display fixture. Other display fixtures, such as stands, racks, and cases, may be used in connection with the disclosed systems and methods.

FIG. 1 depicts a system 100 for monitoring one or more products on display. The system 100 may be used to display and monitor items in a variety of contexts. In this example, the system 100 includes a shelf 102 to support other components of the system 100 and the products on display. Alternative or additional fixtures may be used. The nature and characteristics of the shelf 102 or other fixture may vary. For instance, the shelf 102 or other fixture may be free-standing or not anchored. The shelf 102 or other fixture may also be configured to rest or otherwise be disposed upon other structures, such as a countertop. The shelf 102 or other fixture may be or include a wall-mounted fixture. Examples of wall-mounted retail fixtures may include grid walls, pegboards or slat walls. Other display fixtures such as display cases may be used to display valuable, breakable, or items that require refrigeration. These display cases may have glass front panels. Alternatively or additionally, the shelf 102 or other fixture may include permanent structures. The shelf 102 or other fixture may be integrated with walls or other structures to any extent.

The system 100 may further include a barrier 104 supported by the shelf 102. The barrier 104 provides for an enclosed area in which the product may be organized and/or stored. In this example, the barrier 104 includes a case having a number of walls 106, a number of access panels 108 (e.g., sliding doors), and a lock 109 (e.g., a mechanical and/or electronic lock). The sliding doors 108 may or may not be transparent. Other types of barriers may be used. The barrier 104 may be used to display the products and to protect the products from being stolen or damaged. The barrier 104 may include or be composed of tempered glass or other transparent panels. The barrier 104 may alternatively or additionally include or be composed of non-transparent materials, such as wood, plastic, or fiberboard panels. Examples of access panels may include sliding doors, folding doors and shutters. Examples of locks may include keyed padlocks, combination padlocks, deadbolt locks, lever handle locks, cam locks, combination locks, and the like.

The system 100 further includes a sensor system 110 including a capacitive sensor pad 112 supported by the shelf 102. Further details regarding the sensor system 110 are provided below.

The system 100 has multiple (e.g., three) zones that allow secure display and testing of products, including demonstration or tester product units. The zones may be respectively directed to supporting different display and/or storage functions, including, for instance, testing, limited open product storage, and restricted bulk product storage. In this example, the barrier 104 is configured to define a restricted access zone 114 for storage of inventory units 116A-116D of the product on the shelf 102 and to define an open access zone 118 for instances or units 120A-120D of the product on the shelf 102. The open access zone 118 may be an open area for displaying a limited amount of the product for sale. The restricted access zone 114 may be a restricted area behind the barrier 104 for storage of additional bulk product for sale.

The system 100 includes an additional type of zone for testing or demonstration of the products on display. In this example, the system 100 includes a number of zones 122 for several tester or demonstration units 124A-124D of the products. The units 124A-124D may be unboxed and/or otherwise ready for testing, use, or observation.

The three types of zones may be arranged on the shelf 102 to facilitate customer interaction, product inventory readily available for sales, and further product inventory. In this shelf example, the shelf 102 extends beyond the barrier 104 and provides the demonstration zones 122 for the display pedestals 126. The zones 122 for the product testers are located on or closest to the front edge of the shelf. The open access zone 118 may be disposed around the demonstration zones 122. The open zone 118 may be used for storage of further inventory of product on the shelf. In the example shown, the open access zone 118 is located behind and between the tester zones. The zone 114 for the bulk product stored behind the barrier 104 is located in the back of the shelf 102. Other zone arrangements may be used.

The products in all three zones 114, 116, 122 are capable of being monitored and tracked by the sensor system 110 via capacitive sensors (FIG. 3) under each zone. For instance, the capacitive sensor pad 112 extends across the restricted access zone 114 and the open access zone 116. The capacitive sensor pad 112 is configured to detect movement of the product relative to the restricted access zone 114 or the open access zone 116. For instance, removal from one of the zones, or movement between zones, may be detected. The sensor system 110 includes a processor configured to determine whether the detected movement is indicative of a removal of the product from the restricted access zone 114 or the open access zone 116.

The sensor system 110 and the capacitive sensor pad 112 may be configured as described in U.S. Patent Publication No. 2016/0283899 ("System and method for determining product movement using a sensor"), the entire disclosure of which is hereby incorporated by reference. The capacitive sensor pad 112 provides a sensing surface including one or more electronic reactive sensors, or a sensor array, configured to detect changes in electronic signatures caused by the movement of product and other items. The sensor system 110 also includes a micro-controller or other processor to control the operation of the capacitive sensor pad, generate interaction and other data indicative of the sensor output, analyze the data, determine whether theft, low inventory and/or other conditions are present, and provide any notifications relating thereto. Other capacitive (i.e., reactive) sensing pads and sensor systems may be used.

The capacitive sensor pad 112 may include any number of sensors. In some cases, the capacitive sensor pad 112 includes a single sensor that extends through all of the zones. The sensor pad 112 may be configured to detect changes in the capacitance caused by the interaction with an item placed on a sensor and a ground plane that it rests on. Various sensor arrangements may be used. In some cases, the sensors of the capacitive sensor pads 112 are disposed in an array. The sensors of the capacitive sensor pad 112 may be oriented in various directions, orientations and patterns. In some examples, the system includes multiple sensor pads.

The shape, size, topology, configuration, and other characteristics of the capacitive sensors may vary. In one example, each sensor may be configured to form a parallel-plate capacitor. In some cases, each sensor includes one or more ground planes or other structures. Alternatively, the sensors may share a central ground or other structure.

The system 100 may include a number of display pedestals 126. Each display pedestal 126 is configured to secure the product to the shelf 102 or other fixture to which the display pedestal is mounted. Each tester or development unit 124A-124D of the products may be secured to the shelf 102 via a respective one of the display pedestals 126. In this example, each display pedestal 126 includes a base or stand on which the product unit rests until lifted by a customer.

The system 100 may also include a video display device used to present one or more notifications via visual images according to the event determined. In theft attempts, the video display device may issue an alert to deter the customer from stealing the product. In other cases (e.g., a customer inspecting the product), advertisement, price, or other product information may be displayed. The video display may also provide the customer the option and instructions on how to purchase the product. The system 100 may also include a touch screen or a point of sale device, such as a tablet, credit card terminal, register, and the like that allows the customer to purchase the product.

Figure 2:
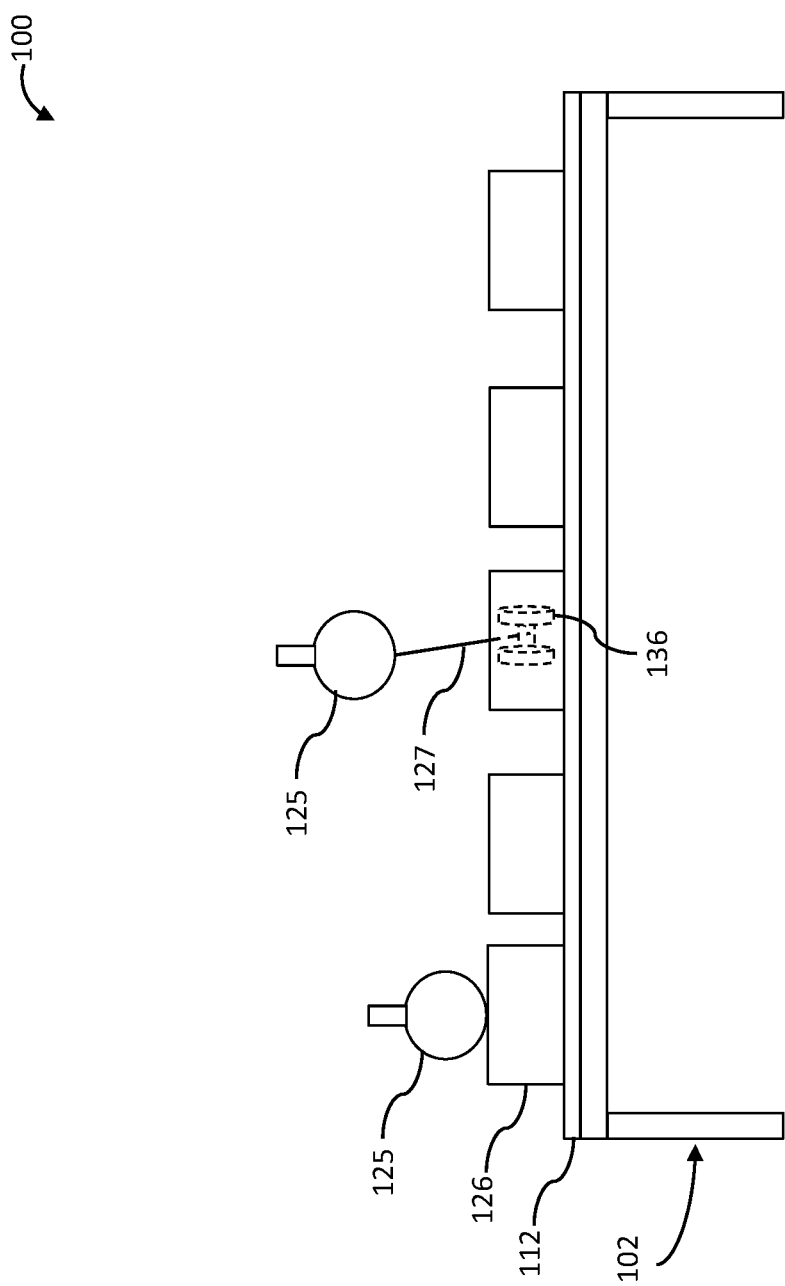
FIG. 2 is a schematic, side view of the product monitoring system of FIG. 1.

FIG. 2 depicts a front view of the system 100 for monitoring a plurality of products 125 on display. The system 100 may include a display pedestal 126 and a capacitive sensor pad 112. Each display pedestal 126 may include a tether 127 to allow movement of the product 125 relative to the shelf 102. The tether 127 and other aspects of the display pedestal 126 may be configured as described in U.S. Pat. No. 9,125,501 ("Fixed display pedestal, system and/or method for securing an article"), the entire disclosure of which is hereby incorporated by reference. The pedestals described therein secure the product item to the fixture while allowing manipulation, testing, and other interaction with the product. The pedestals include a tether to allow the product item to be pulled away from a base of the pedestal. Other display pedestals may be used.

The display pedestal 126 may support the product 125 when the tether 127 is disposed in a retracted position such that the display pedestal 126 is disposed between the product 125 and the capacitive sensor pad 112 when the product 125 is in a retracted position. In the retracted position, the product 125 may appear to be resting or sitting on top of the display pedestal 126.

The display pedestal 126 may include a spool 136 about which the tether 127 is wound in a retracted position. By using the spool 136, the tether 127 is retracted after the product is released. When in a retracted position, the tether is stored in a neat and orderly manner to facilitate its use. In other cases, the display pedestal 126 does not include a spool.

The display pedestal 126 may further include a base or housing anchored relative to the shelf 102. The base may be disposed between the product 125 and the capacitive sensor pad 112 when the tether 127 is disposed in a retractable position.

The product 125 may be on display and/or the customer may want to use, manipulate, test or move the product 125. By using the extension and retraction of the tether 127, the display pedestal 126 allows the product 125 to be lifted by the customer while keeping the product 125 secure.

Extension and retraction of the tether 127 may be sensed by the capacitive sensor pad 112. Therefore, the capacitive sensor pad 112 detects the lift of the product from the base of the display pedestal 126. The base of the display pedestal 126 may contribute to a capacitive signature of the capacitive sensor pad for the product. Additionally, the tether or a coil spring of the display pedestal 126 may contribute to the capacitive signature of the capacitive sensor pad 112 for the product. Thus, in some cases, the detection of product movement may not be dependent on size or mass of the product. In such cases, the capacitive sensor pad 112 detects the change in capacitance resulting from extraction (e.g., unwinding) or retraction of the cable or other component of the tether. Additionally, the capacitive sensor pad 112 may detect a change in capacitance resulting from a change in position of the product relative to the capacitive sensor pad even though the display pedestal 126 is disposed in between the product and the capacitive sensor pad 112 when the product is disposed in a retracted position.

The capacitive sensor pad 112 may detect each instance of the lift of the product from the display pedestal 126. The sensor system 110 may include a processor configured to generate, based on each detected instance of the lift of the product, interaction data indicative of the customer interactions with the product.

The system 100 combines the product monitoring of the sensor system 110 with the product testing aspects of the display pedestals 126, and/or the zone-based product display arrangement aspects of the shelf 102 to provide secure product display, limited open product storage, and restricted bulk product storage. Consumer experience, decreased shrink, and inventory management may thus be improved.

Figure 3:
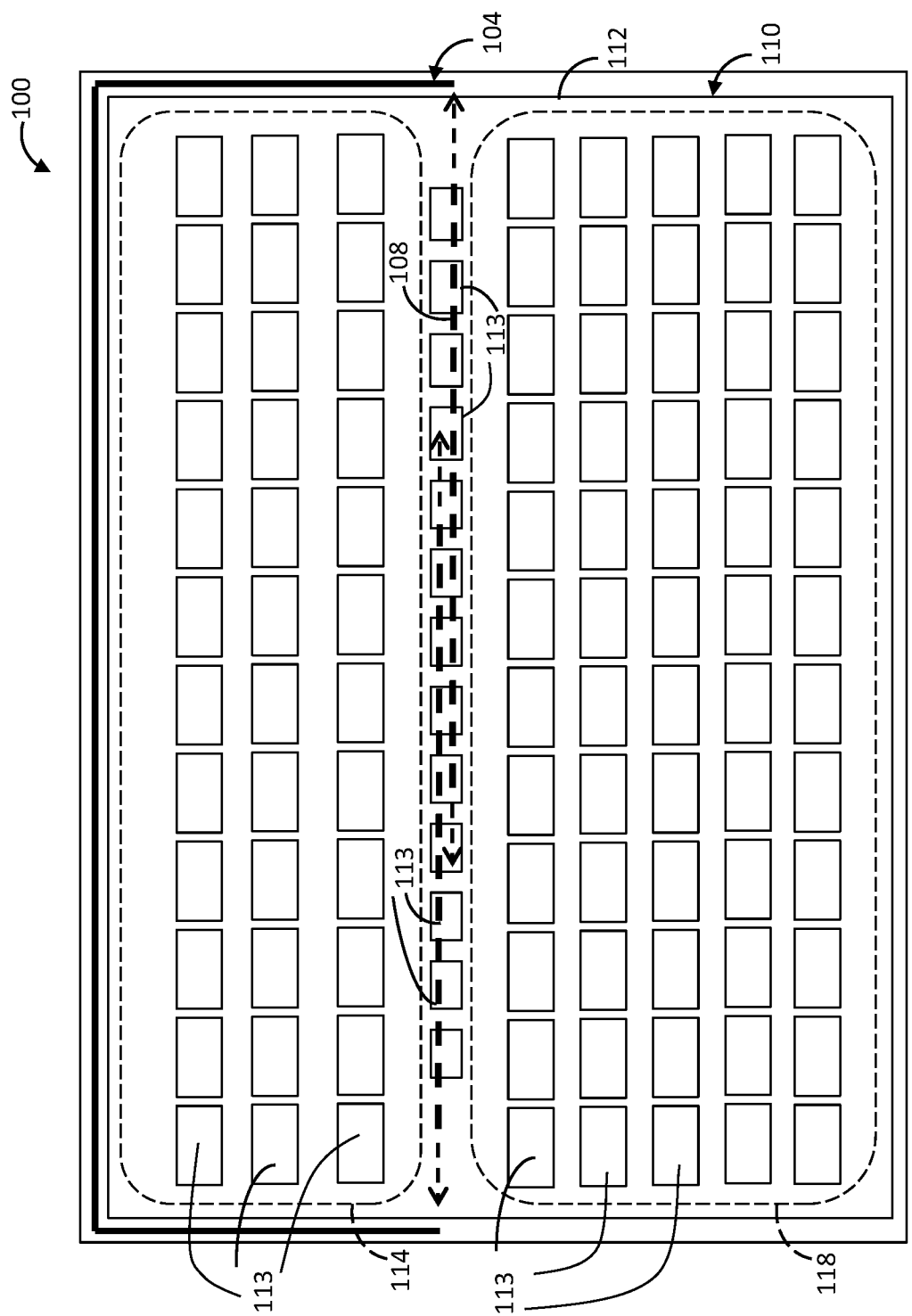
FIG. 3 is a schematic, plan, and partial view of the product monitoring system of FIG. 1.

FIG. 3 depicts a cutaway top view of the system 100 for monitoring one or more products on display. The capacitive sensor pad 112 may include a plurality of capacitive sensors 113. The plurality of capacitive sensors 113 may be arranged in an array within the capacitive sensor pad 112, or in other arrangements. A subset of the capacitive sensors 113 may be disposed in an area of the capacitive sensor pad 112 below the access panels 108. In some cases, one or more of the capacitive sensors 113 of the capacitive sensor pad 112 are positioned to detect the movement of one or both of the access panels 108. Each access panel 108 may be configured to facilitate the detection. For instance, each access panel 108 may include a metal slug or other object for detection by the capacitive sensors 113.

Figure 4:
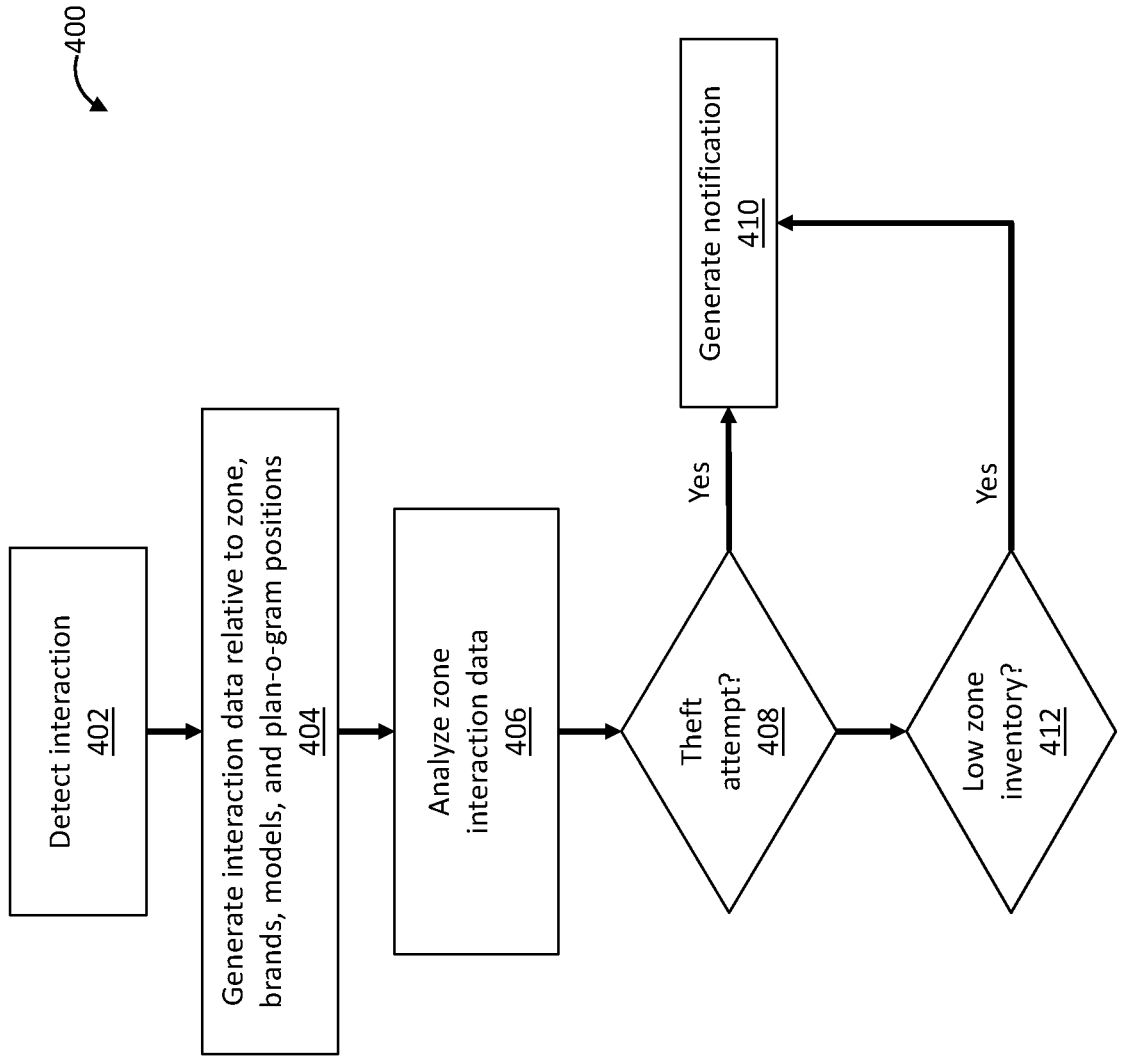
FIG. 4 is a flow diagram of a method of monitoring a product display and inventory in accordance with one example.

The product monitoring may be implemented for various reasons, including, for instance, theft deterrence, inventory management, and customer interaction tracking. An example of a monitoring method 400 is shown in FIG. 4. The method of FIG. 4 may be implemented by the system 100 of FIG. 1. Other systems may be used.

In the example of FIG. 4, the method 400 may include an act 402 in which an interaction with a product via a sensor system is detected. The sensor system 100 may include a capacitive sensor pad 112 and a display pedestal 126 supported by a fixture (e.g., a shelf). The sensor system 100 may be otherwise configured as described above. The capacitive sensor pad 112 may be disposed between the fixture and a display pedestal 126. The display pedestal 126 may secure the product to the fixture. The capacitive sensor pad 112 may detect the movement of the product relative to the fixture. The movement of the product may take place when a customer interacts with the product. The detection of the interaction may include detecting a lift of the product from the display pedestal 126. In some cases, the act 402 (or another act) includes detecting movement of an access panel or other barrier, as described above. In an act 404, interaction data indicative of customer interactions with the product is generated based on the detected interaction. In some cases, the interaction data is generated on a zone-specific basis. For instance, the interaction data may track movement of instances of the product relative to a respective zone, such as a restricted access zone. The fixture or shelf may include a barrier that defines the restricted access zone. The restricted access zone may be used, for example, as storage of inventory of the product on the shelf. In an act 406, the interaction data may then be analyzed. In some cases, the interaction data is compared with sales or other data for the product, such as brand, model, or plan-o-gram position information.

In some cases, a processor may be configured to manipulate the captured data and/or to determine statistical data. Statistical data may be, for example, be indicative of a quantity of lifts of the product, a frequency of lifts of the product and/or a duration of lifts of the product. A clock may identify the time of day of a lift, the time of day of a return and/or may time a lift duration.

The analysis of the interaction data may then support a number of determinations. In this example, the method 400 may include an act 408 in which it is determined whether the interaction data is indicative of a theft attempt. The method 400 may also include an act 412, in which it is determined whether a low inventory condition exists in one or more of the zones. The interaction data may also determine whether the customer desires to purchase the product. In either case, an appropriate notification may be generated.

The nature of the notifications may vary, e.g., in accordance with the type of event. In theft attempts, the video display device may issue an alert to deter the customer from stealing the product. In other cases (e.g., a customer inspecting the product), advertisement, price, or other product information may be displayed. The video display may also provide the customer the option and instructions on how to purchase the product.

The disclosed systems and methods provide detection, recording, and alerting when items are interacted with, tested, removed, or placed on the shelf or display rack. Further details regarding, and/or alternative or additional features of, the above-described systems and methods are set forth below.

Figure 5:
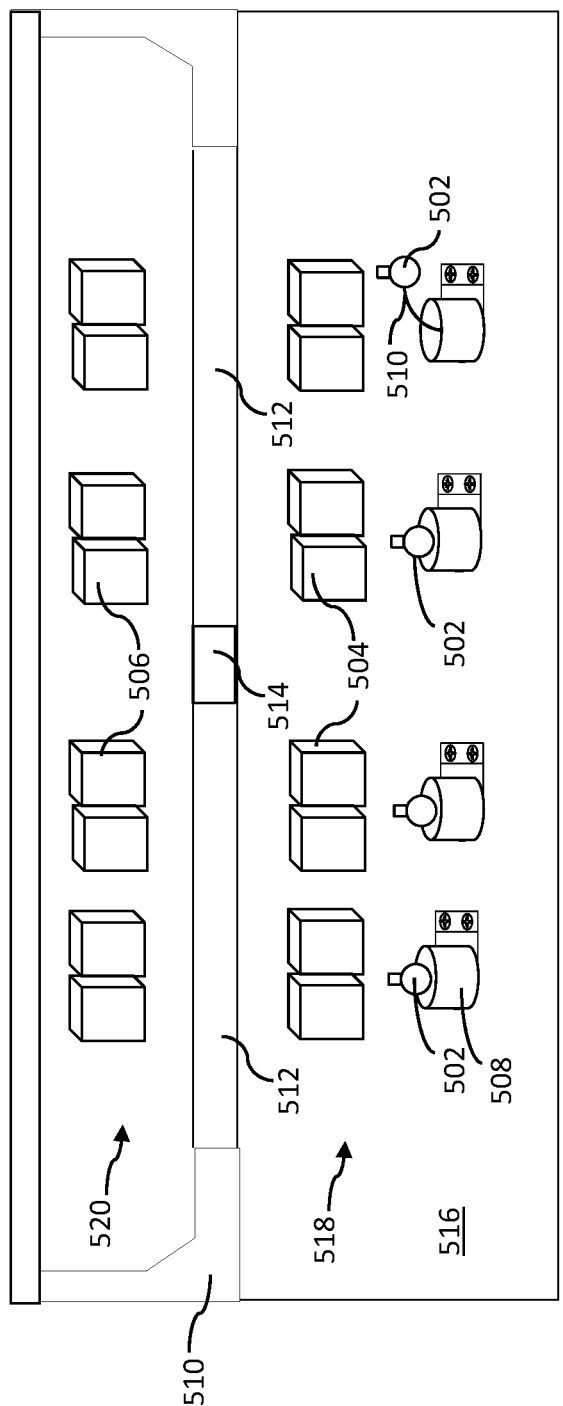
FIG. 5 is a plan view of a product display shelf having a product monitoring system in accordance with an example in which fragrance product items are monitored, displayed, arranged, and/or stored in multiple zones (e.g., a tester zone, an open sale zone, and a back inventory zone).

FIG. 5 depicts a product monitoring system 500 in accordance with another example. In this case, the system 500 is configured to display, store, and monitor fragrance product items in multiple zones. Some aspects of the system 500 may be configured similarly to the examples described above. For instance, the system 500 is configured to establish multiple zones for the product items (e.g., a tester zone, an open sale zone, and a back inventory zone).

The system 500 may be configured to display instances of the product items as product testers 502 (or samples). Each tester 502 is supported by a base or housing 508 of the system 500. Each tester 502 is secured to the base 508 via a retractable aircraft cable tether 510. The end of the cable tether 510 may be removably or non-removably attached to the product tester 502. The base 508 may be mounted near the edge of a sensing surface 516 to position the testers 502 for consumer interaction and testing of the product.

The sensing surface 516 includes an area 518 disposed between and behind the product testers 502 where additional product may be placed for access by customers. The sensing surface 516 includes an additional area 520 behind the area 518 for secured storage (e.g., bulk storage) of product items 506. The areas 518 and 520 may be separated from one another by a restricted access barrier 510 that allows additional bulk product 506 to be stored and retrieved later by employees for restocking the open product area. The barrier 510 may have access doors 512 or a panel that is lockable using a mechanical or electronic lock 514. Together, the components of the system 500 provide a solution that allows consumers to securely interact with products and users to monitor and record item movement, manage inventory, and detect and alert of potential theft activity. Such features allow users to determine consumer responses to display items arrangements and promotions, inventory levels, and potential theft activity.

Various arrangements of sensor pads, barriers and testers may be used, connected with one another, or deployed as part of an interconnected array of such sensor pads, testers, and barriers. In some cases, the sensor pads relay signals to a micro-controller circuit board configured to detect and record the unique signature of the aforementioned change in the electromagnetic field. Thereafter, the information is relayed to be stored in a database from which the information may subsequently be retrieved.

The disclosed systems and methods may provide notification (e.g., real-time notification) regarding the movement, placement or removal of items thereon and allows for instantaneous feedback. A user or operator of the system may be quickly notified of the movement or depletion of the stock or display items of a product or of an unauthorized removal of an item placed on the sensor arrangement with a high degree of accuracy and reliability and without the need for repetitive physical verification by a person.

In one aspect, an inventory tracking system includes sensor pads that include sensors and ground planes. The sensor pads and the ground plane may be configured to detect movement of an item via a change in sensor readings caused by the interaction between the sensor, the displayed product, and the shelf. A controller communicatively is connected to the sensor pads. A database receives data from the controller and is configured to generate a signal signature based in part on the change in the sensor when items are moved.

In one aspect, the system includes a cabling or tethering device, i.e., a tester, that attaches to display items such as fragrance bottles and to the sensor surface. The sensors are able to detect movement of products when they are lifted off the tester base to be interacted with by consumers due to changes in the electromagnetic sensor signals caused by either product movement, tester mechanical changes, or both.

In one aspect, the system includes a restricted access barrier used to allow additional storage of bulk inventory available for sale. Sensors in the barrier surface are able to detect removal and absence of products behind the barrier. The barrier may have doors that can be locked using a mechanical or electromechanical lock mechanism.

In one aspect, a method of inventory tracking includes the steps of detecting a sensor change when an item is moved, placed on a sensor pad, generating a signal signature based in part on the sensor change, and tracking a movement of said item based in part on a change in said item location indicated by said signal signature.

In one aspect, a method of inventory tracking includes the step of associating said signal signature into a database as an item location for said item. In another aspect, the method of inventory tracking repeats all of its constituent steps after a predetermined period of time.

In one aspect, a method of inventory tracking includes the step of displaying the said movement of said item to a user via a computing device. In another aspect, the method of inventory tracking includes the steps are performed at least in part by an apparatus that includes sensor pads, cabling, and barriers, in which the sensor pads, cabling, and the barrier are configured to detect movement of an item via a change in the sensor caused by the interaction between the sensor, cable, and or the barrier, and the item; a controller communicatively connected to one or more sensor pads; and a database that receives data from the controller and is configured to generate a signal signature based in part on the change in the sensor.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system for monitoring a product on display, the system comprising:
   a shelf;
   a barrier configured to define a restricted access zone for storage of inventory of the product on the shelf and to define an open access zone for instances of the product on the shelf; and
   a sensor system comprising a capacitive sensor pad, the capacitive sensor pad being supported by the shelf, extending across the restricted access zone and the open access zone, and configured to detect movement of the product relative to the restricted access zone or the open access zone;
   wherein the sensor system comprises a processor configured to determine whether the detected movement is indicative of a removal of the product from the restricted access zone or the open access zone.

2. The system of claim 1, wherein the processor is further configured to generate a low inventory notification based on the removal of the product results in a low inventory condition in the restricted access zone or the open access zone.

3. The system of claim 1, wherein the sensor system is configured to track movement of the instances of the product relative to the restricted access zone.

4. The system of claim 3, wherein the processor is configured to determine whether a low inventory condition is present based on the tracked movement of the instances of the product.

5. The system of claim 1, wherein the barrier and the sensor system are configured such that the capacitive sensor pad detects movement of the barrier.

6. The system of claim 1, wherein:
   the open access zone comprises a demonstration zone in which further tester units of the product are displayed for testing and an open storage zone around the demonstration zone for storage of further inventory of the product on the shelf; and
   the capacitive sensor pad extends across the open storage zone such that the sensor system is configured to track movement of further instances of the product in the further inventory.

7. The system of claim 1, wherein the barrier is supported by the shelf.

8. The system of claim 1, wherein the barrier comprises a plurality of sliding doors.

9. The system of claim 1, wherein the barrier further comprises a lock.

* * * * *